Dec. 21, 1965  R. H. DAMON, JR  3,224,520
TRANSDUCER MOUNTING IN WEIGHING APPARATUS
Filed Feb. 2, 1965                          2 Sheets-Sheet 1
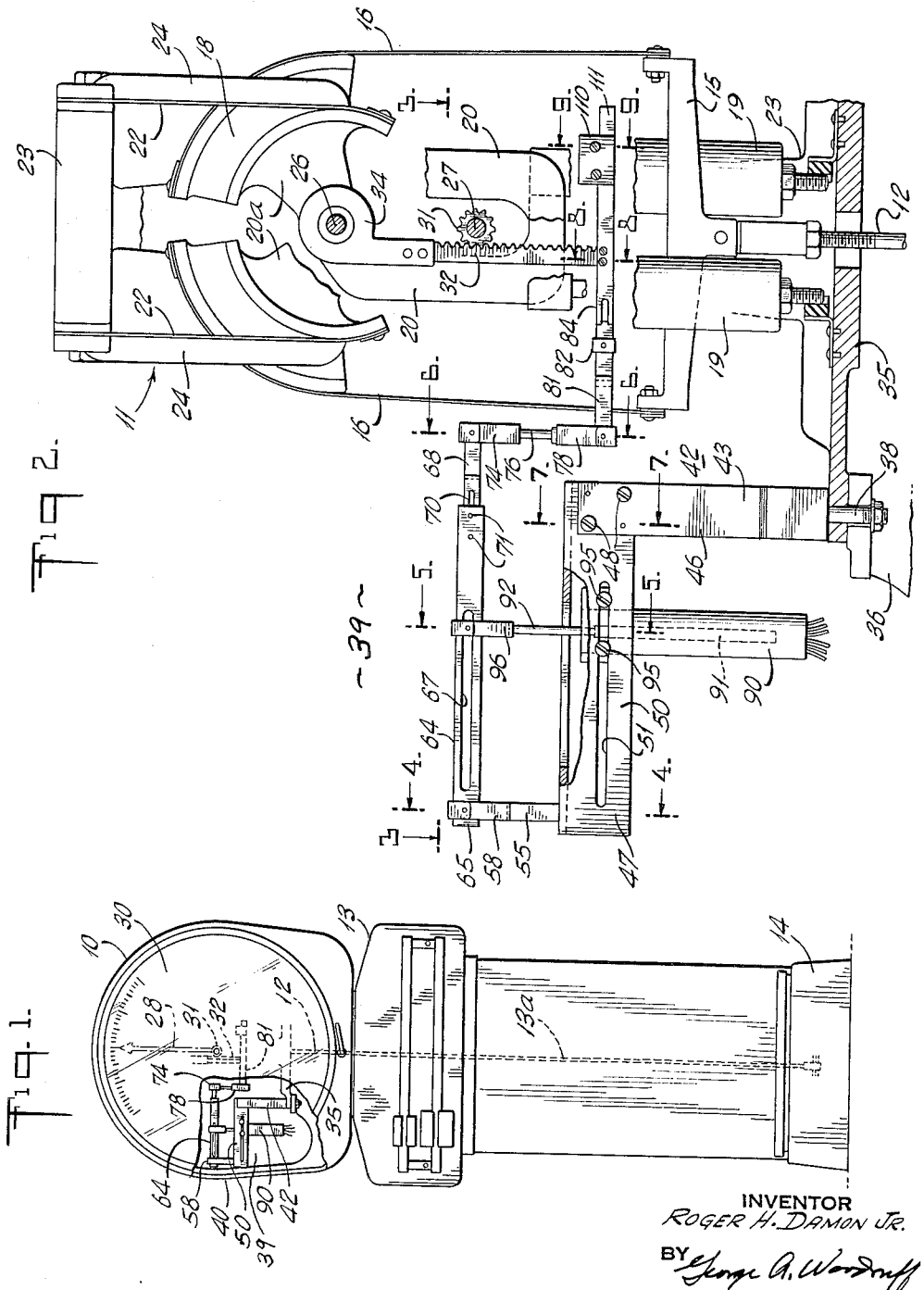
INVENTOR
ROGER H. DAMON JR.
BY George A. Woodruff
ATTORNEY

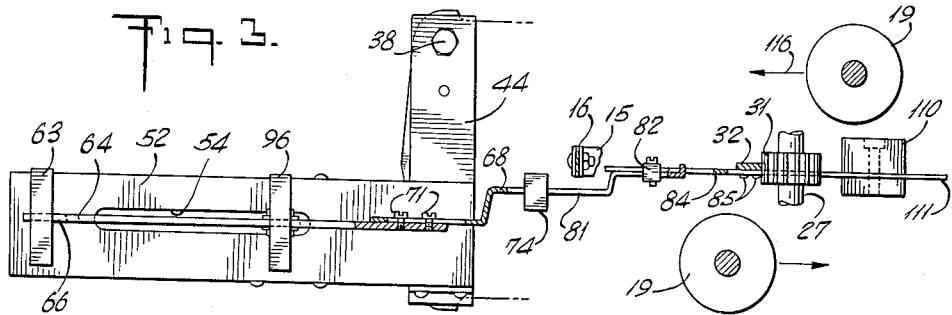
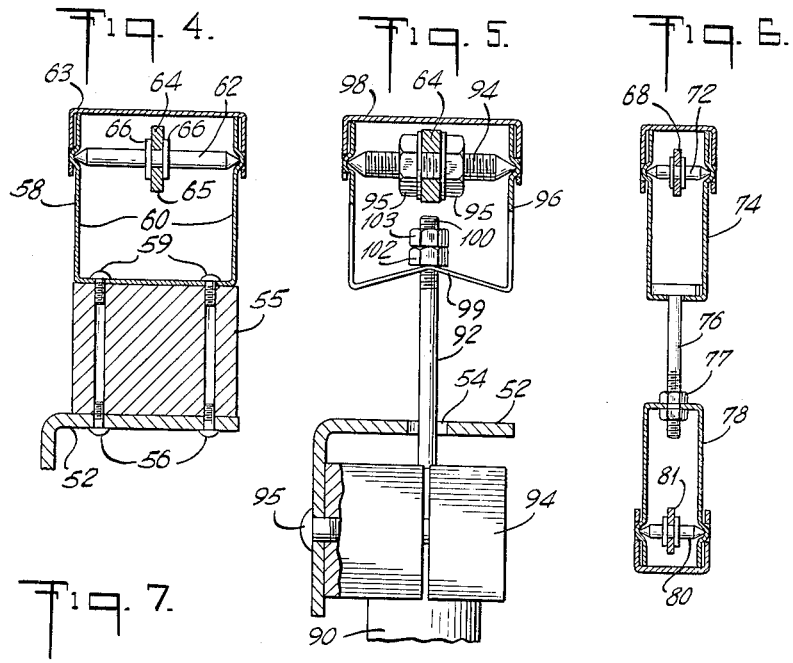
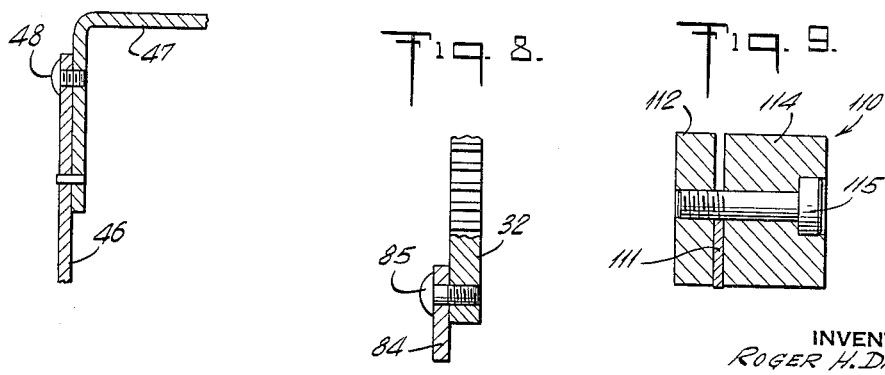

United States Patent Office
3,224,520
Patented Dec. 21, 1965

3,224,520
TRANSDUCER MOUNTING IN WEIGHING APPARATUS
Roger H. Damon, Jr., St. Johnsbury, Vt., assignor to Fairbanks Morse Inc., New York, N.Y., a corporation of Delaware
Filed Feb. 2, 1965, Ser. No. 429,838
6 Claims. (Cl. 177—210)

This invention relates to improvements in weighing apparatus, and more particularly to improved arrangement and means for operatively associating signal generating transducer means in such apparatus.

In weighing apparatus having counterbalance and indicator mechanism including rack and pinion drive of the indicator, where it is desired to include a signal generating transducer such as a differential transformer for remote indication of weight or other control purposes, it is known and prior practice to locate the transducer with its movable element or core in direct, usually suspended connection to the indicator drive rack. Such prior practice is attended by a number of disadvantages, one of which is the necessity to use large size transducers because of the relatively long travel of the indicator drive rack in moving between zero and capacity weight indications. Another is in space restrictions in the region of the rack, which introduce transducer mounting difficulties including the difficulty of locating the transducer for ready accessibility, as for adjustment or replacement.

Accordingly, an object of this invention is to overcome the foregoing noted disadvantages, by providing readily accessible location of the transducer and operative association thereof with the indicator rack in improved manner permitting use, selectively, of transducers of various sizes and core displacement characteristics.

Another object is to dispose the transducer in an accessible area laterally removed from the indicator pinion drive rack, and to provide an improved operative connection between the transducer and the rack including adjustable means to compensate for operative connection loading of the rack laterally against the rack driven pinion.

The foregoing and other objects and advantages of the present invention will appear from the following description of a presently preferred embodiment of the invention as illustrated by the accompanying drawings.

In the drawings:

FIG. 1 is an elevational view of a platform scale and dial head assembly with a portion of the latter broken away to show the location of present improvements;

FIG. 2 is an enlarged view of the dial head counterbalance indicator mechanism, showing in elevation the presently improved transducer mounting and operative connection to the indicator;

FIG. 3 is a fragmentary top sectional view as taken from line 3—3 in FIG. 2, showing features of the present improvements;

FIGS. 4, 5 and 6 are transverse sectional views of the transducer mounting and operating mechanism, the views being taken respectively from lines 4—4, 5—5 and 6—6 in FIG. 2, and FIGS. 7, 8 and 9 are fragmentary sectional views of details of the present improvements, as taken respectively from lines 7—7, 8—8 and 9—9 in FIG. 2.

The present invention is especially suitable for embodiment in dial indicator mechanism associated with weighing equipment, such as the dial indicator of a platform type weighing scale illustrated, for example, in FIG. 1. As there shown, the indicator casing or dial head 10 houses a counterbalance and indicator mechanism 11 (FIG. 2) which is coupled by a load rod 12 through a tare beam unit 13 in usual manner not here shown, to steelyard rod 13a which extends to the lever system (not shown) in the scale platform unit 14.

Mechanism 11 may be of any well known form, but for present example is shown in FIG. 2 as of double pendulum character. Rod 12 is connected to a cross bar 15 and the latter is connected at its ends by suitable flexible ribbons or tapes 16 to the pendulum sectors 18 each of which supports a pendulum 19 through a sector arm 20. Each sector 18 is suspended by a tape 22 from the upper part of the mechanism frame 23, and these sectors respond to scale load pull on rod 12 by upward angular displacement in contact with fixed guides 24. Such sector movements result in outward swing of the pendulums to positions counterbalancing the load pull consequent to scale platform loading, the pendulums in the present example crossing each other from the no-load positions shown in FIG. 2. The pendulum arms are mechanically related for synchronous movement through a pivot shaft member 26 which in the no-load to scale capacity displacement response of the pendulum sectors, moves in a plane parallel to the guides 24 and to an extent proportional to the weight on the scale platform. For convenience here, the detail of the connection between the shaft 26 and the upper parts 20a of the sector arms is not shown as such is well known in the art. Centrally in the dial head is an indicator shaft 27 suitably journalled (not shown) in the mechanism frame 23 to have its axis in the plane of the shaft member 26. On shaft 27 is weight indicator or pointer 28 (FIG. 1) operative over a dial chart 30 provided with weight graduations from 0 to capacity weight. Also on shaft 27 is a pinion 31 drivingly engaged by a vertically arranged drive rack member 32. Rack 32 is carried by a support fitting 34 at its upper end, the fitting extending laterally of the rack to pivotal support on the sector shaft member 26, whereby the rack is moved with shaft member 26 proportionately to scale loading and drives the pinion 31 to move indicator 28 for weight indication. Through the laterally extending fitting 34 the rack is eccentrically mounted on shaft 26 such that it is gravity influenced or biased toward the pinion 31, whereby to afford a desired degree of rack tooth pressure engagement with the pinion.

The counterbalance indicator mechanism 11, which as now briefly described is well known and widely used, is mounted in the dial head casing 10 in a central position therein. As shown in FIG. 2 the base portion 35 of the mechanism frame 23 is supported by internal flange portions 36 of the casing, being secured thereto by suitable mounting bolts 38. It will appear from the views of FIGS. 1 and 2 that a considerable open or free zone or space generally indicated at 39, is afforded between the mounted mechanism 11 and the side wall 40 of the casing. Such unobstructed space is here utilized to advantage for the location of desired transducer means which in accordance with the present invention, is operatively coupled to the indicator rack 32 in an effective manner now to be described.

Located in space 39 is a bracket structure 42, the structure including a mounting member 43 having its lower or horizontal part 44 (FIG. 3) seated upon the outer end of the mechanism base portion 35 and secured thereon by the base mounting bolts 38, and providing a vertically upright portion 46. Extending horizontally from the upper end of upright portion 46 toward and terminating near casing wall 40 is a flange bracket arm 47 of angle-iron form in section, suitable means including screws or bolts 48 rigidly attaching the arm to the upright. The vertical flange 50 of arm 47 has a longitudinal slot 51, while the horizontal flange 52 (FIG. 3) is provided with a longitudinal slot 54, these slots serving a purpose to appear.

Arranged on arm flange 52 near the outer or terminal end of the arm (see FIG. 4) is a pivot stand 55 secured in place by suitable screws 56. Supported by the stand is a pivot or fulcrum yoke member 58, attached thereto by screws 59, and presenting spaced vertical legs 60 recessed to receive the conical tip ends of a pivot shaft element 62 extending therebetween. Spanning the upper free ends of the legs 60 is a spring clip 63 to retain the legs in supporting relation to the pivot element 62. Element 62 pivotally supports a lever arm 64, the lever arm which has its outer end 65 seated centrally on the pivot element and secured in place by clamp collars 66, extending over the bracket arm flange 52 with its longitudinal axis in a vertical plane containing the longitudinal axis of the flange slot 54. Arm 64 is provided with a longitudinal slot 67 (FIG. 2) for a purpose to appear. An angulate lever arm extension 68 has one end slotted at 70 and in adjustable attachment by screws 71 to the free end of lever arm 64, and its opposite end connected by a pivot shaft element 72 to a yoke member 74 depending therefrom (FIG. 6). Fixed to yoke 74 is a depending rod 76 which extends to adjustable connection at 77 with a second yoke 78 on a pivot shaft element 80. As will be observed the yoke units 74 and 78 may be and are here shown as similar in construction to the yoke assembly 58. Pivot element 80 is fixed to the outer end of an angulate link 81, the latter being longitudinally adjustably connected by a suitable clamp 82 in the manner illustrated in FIGS. 2 and 3, to a bar 84 arranged normal to the rack 32 and rigidly attached to the bottom end of the rack by screws 85.

It is apparent from the foregoing that movement of rack 32 in counterbalance indicator operation between zero and scale capacity results in pivotal displacement of the lever arm 64, and that the arm extension 68 at its pivot point 72 will have approximately the same vertical displacement as that of the rack 32. Since the lever arm turns about its fixed pivot 62, the vertical extent of arm displacement at any point intermediate its ends will be correspondingly less. As hereinbefore noted, among the objectives of the present invention are to afford operative mounting of transducer means in a readily accessible position, and to permit the selective use of transducer means wherein the movable element thereof (as the movable core of a differential transformer) has an effective range of displacement very considerably less than the full zero to scale capacity displacement of the indicator drive rack 32. Such short stroke transducers are generally small in size, less costly and are found to present excellent linearity characteristics making them especially desirable and suitable for use in weighing equipment as in the present example, to develop outputs proportional to scale loading as for application to remote weight indication, control of associated apparatus or other purposes requiring weight proportional control or operation. The present bracket and rack operated lever system are directed to the attainment of the foregoing objectives, and are provided to afford, with the physical limits of the dial head space 39, the necessary length of level arm in relation to the miximum (capacity) displacement of the indicator drive rack, in order to accommodate small transducers designed for effective stroke of its movable element within a distance range which is an appreciably small fraction of the full movement range of the indicator rack. By way of example in respect to the latter, where the full zero to capacity travel of rack 32 is of the order of 2 inches (in a typical installation) and the desired selected short stroke differential transformer has a relatively small effective core stroke of say about .25 inch, representing about an 8:1 ratio, the lever is selected to have a length between its pivot point 62 and the yoke pivot 72 approaching 8 inches. This will permit convenient operative connection of the transducer core to the lever at a point thereof relatively near its pivot point 62, to attain the indicated ratio of core travel to indicator rack travel.

In the present illustration, the transducer 90 which is here indicated as being a differential transformer unit having movable core 91 and projecting operating rod 92, is adjustably mounted on bracket flange 50 as by a suitable clamp device 94 having its attachment screws 95 extending through the flange slot 51. The rod 92 extends upwardly and freely through slot 54 in bracket flange 52 toward lever arm 64 for operative connection thereto in a manner to be described. Since for example here, the transducer 90 has an effective core stroke in a ratio about 1:2 with the zero to capacity travel of the indicator rack 32, such transducer is in mounted position near the inner end of the slot 51 and with its rod 92 projecting through slot 54 near the inner end of the latter, toward approximately the mid-point of the lever arm length between the arm support pivot 62 and the yoke pivot 72. Connection to the lever arm is made through a pivot pin 94 (FIG. 5) extending laterally through arm slot 67 (near its inner end) and clamped to the arm by opposite clamping nuts 95. Pin 94 has conical ends which seat in recesses in the arms of a yoke 96, the yoke arms being retained in position by a spring clip 98. The cross piece of the yoke is desirably angulate to form a central hump or apex area 99 which is apertured to receive therethrough the upper threaded end 100 of transducer core rod 92, and the threaded on end 100 are rod mounting nut 102 and its lock nut 103.

Thus the transducer core and rod are in pivotal suspension from the pivot pin 94, and in gravity suspended support on the yoke apex portion 99. The nuts 102–103 permit vertical adjustments in the relative positions of the core and lever arm, while through nuts 95 the position of pivot pin 94 longitudinally of the lever arm may be adjusted for initial vertical alignment of the yoke and core. Upon displacement of the lever arm, in scale operation of rack 32, the pivotally suspended transformer core and rod will follow the arm by vertical displacement, but since the lever arm has arcuate movement, the core and rod will have also a lateral or horizontal component of displacement. However, because the effective length of the lever arm is an appreciable multiple of the full (zero to capacity) travel of indicator rack 32 as hereinbefore indicated, such lateral component movement will be correspondingly small and accommodated by the normal clearance between the core and the transformer center bore receiving the core.

The present transducer mounting and operating lever system as now described and illustrated, attains the objectives of the invention as herein expressed, affording accessible location of the transducer and permitting through the longitudinal mounting bracket slots 51 and 54 and the lever arm slot 67, application of selected transducers differing in effective core stroke and wherein the full extent of such stroke is a fraction of the indicator rack travel length between zero and scale capacity. As hereinbefore mentioned in connection with the dial head counterbalance indicator mechanism to which the present invention is applied, the rack 32 is eccentrically mounted on sector shaft 26 so as to be gravity influenced toward pinion 31 for desired tooth pressure engagement therewith. In view of the present transducer lever mechanism in connection to the rack, it will be appreciated that the lever 64 and connecting linkage including rack connected bar 84, together with the lever suspended transformer core and its rod, impose a load on the rack tending to increase the pressure engagement thereof with the indicator pinion 31 to an undesirable extent. Such loading of the rack is here counterbalanced as by a compensating weight 110 adjustably carried on an extension 111 of bar 84 (FIGS. 2, 3 and 9) projecting outwardly from the tooth side of the rack. Preferably the weight is a two-part member having its parts 112 and 114 releasably connected together and in clamped engagement with bar extension 111 by suitable screws 115. Thus the weight may be appropriately positioned along the bar extension for desired counterbalancing adjustment.

In the pendulum counterbalance mechanism as illustrated in FIG. 2, the pendulums 19 are shown in initial or scale no-load positions. Upon scale loading, the pendulums swing outwardly to positions counterbalancing the scale applied load, the left hand pendulum swinging in the right hand direction as viewed in the figure, while the right hand pendulum swings oppositely or toward the left of the figure as in the direction of the bracket assembly 42. Hence in order to avoid any interference by the bracket structure and its supported transducer and lever system with the leftward swinging pendulum, the bracket structure is disposed in a position (FIG. 3) to one side and clear of the path of pendulum swing indicated by the arrow 116 in FIG. 3. Since the rack 32 is between the swing paths of the pendulums, the operative connection between the lever 64 and rack bar 84 thus requires angulate or off-set portions here comprising the angulate lever arm extension 68 and angulate link 81. Moreover, the angular or off-set form of link 81 is further necessary to clear the link from interference with the left hand tape 16 on cross bar 15, as seen in FIGS. 2 and 3.

In the view of FIG. 2 the lever arm 64 is shown in a horizontal position when the rack 32 is at its lowermost position corresponding to scale no-load positions of the pendulums 19. The lever arm thus will pivot upwardly from that initial position, in weighing operations of the scale. However, it will be appreciated that by adjusting the yoke connection 74–76–78 between the lever extension and link 81 to shorten the length thereof, the initial position of the lever arm 64 may be at an angle below the horizontal position of FIG. 2 and to an extent sufficient to determine the horizontal position of the lever arm as that effected by the rack 32 when the latter is at the mid-point of its operative travel. An advantage attained by so altering the initial lever arm position, is a desirable reduction in the lateral component of transducer core displacement in lever operation thereof. For example, where the transducer core is centered in the core-receiving bore when the lever arm is in its initial position at an angle below the horizontal position shown in FIG. 2, scale operation of rack 32 to bring lever arm 64 to the illustrated horizontal position (corresponding to the mid-point of rack travel) will result in slight lateral displacement of the core. Further movement of the rack to scale capacity position then pivots lever arm 64 to an angulate position above the horizontal mid-point position, which results in return of the core to laterally centered position in the transducer bore. Consequently, in this modified condition the lateral component of core displacement will be approximately one-half that obtaining when the initial position of the lever arm is horizontal.

Having now illustrated and described the invention in a presently preferred embodiment thereof, it is to be understood that the same may be modified without departing from the scope of the invention as hereinafter claimed.

I claim:

1. In weighing apparatus having counterbalancing means and weight indicator means, the indicator means including a driven member and a drive member operable by the counterbalancing means and in driving engagement with the driven member, wherein the drive member is adapted and arranged such as to be under a predetermined bias in the direction to maintain drive contact thereof with the driven member, the combination therewith of a lever pivotally mounted at one end, lever pivoting means in connection to the other end of the lever and operable by said drive member, a transducer having an element movable to vary the effect of the transducer, means mounting the transducer adjacent said lever with its movable element extending toward the lever at a point thereof intermediate the lever ends, means connecting said element to the lever, said lever and element imposing on said drive member through said lever pivoting means, a load tending to increase said predetermined bias of the drive member, and means effective through the lever pivoting means to counterbalance said load.

2. In weighing apparatus having counterbalancing means including a pivot member vertically displaceable proportionately to weight counterbalancing operation of the counterbalancing means, and weight indicator means including a driven pinion rotatable on a horizontal axis disposed in a vertical plane containing the axis of said pivot member, a rectilinear toothed drive rack extending vertically and enmeshing the pinion, and means adjacent the upper end of the rack and extending laterally thereof to pivotal connection with said pivot member, thereby supporting the rack eccentrically relative to the pivot member such that the rack is under gravity-bias laterally toward the pinion, the combination therewith of a lever pivotally mounted at one end and projecting toward said rack, an arm carried by the rack adjacent its lower end and extending in the direction of said lever, link means interconnecting said arm and the free end of said lever, a transducer having an element movable to vary the effect of the transducer, means mounting the transducer adjacent said lever with its element connected to the lever at a point thereof intermediate the lever ends, said element, lever, link means and arm imposing on said rack a load tending to increase said gravity-bias of the rack toward the pinion, said arm includnig an extension projecting laterally from the pinion side of the rack, and weight means on said extension counterbalancing said load.

3. In weighing apparatus having counterbalancing means including a pivot member vertically displaceable proportionately to weight counterbalancing operation of the counterbalancing means, and weight indicator means including a driven pinion rotatable on a horizontal axis disposed in a vertical plane containing the axis of said pivot member, a rectilinear toothed drive rack extending vertically and enmeshing the pinion, and means adjacent the upper end of the rack and extending laterally thereof to pivotal connection with said pivot member, thereby supporting the rack eccentrically relative to the pivot member such that the rack is under gravity-bias laterally toward the pinion, the combination therewith of a lever pivotally mounted at one end and projecting toward said rack, an arm carried by the rack adjacent its lower end and extending in the direction of said lever, link means interconnecting said arm and the free end of said lever, support means having a support portion spaced from and extending in the longitudinal direction of the lever, a transducer having an element movable to vary the effect of the transducer, means mounting the transducer on said support portion in selected position therealong with its movable element extending toward the lever intermediate the lever ends, connector means between said element and the lever adjustable along the lever, said element, connector means, lever, link means and arm imposing on said rack a load tending to increase said gravity-bias of the rack toward the pinion, said arm including an extension projecting laterally from the pinion side of the rack, and weight means adjustably positionable along said extension to counterbalance said load.

4. In weighing apparatus having weight indicator means including an indicator actuating member movable along a linear path and to an extent proportional to weighing response of the apparatus, a transducer having an element movable linearly to vary the effect of the transducer, means mounting the transducer in a position spaced from said member laterally of its linear path of movement, and means operatively connecting said member to said element adapted and arranged for effecting in response to movement of the member, linear movement of said element to an extent which is predetermined fraction of the linear movement of said member.

5. In weighing apparatus including an indicator housing, a counterbalance mechanism unit disposed centrally in the housing and defining with a side wall of the housing an unobstructed region therebetween, said unit providing weight indicator means including an indicator actuating member having rectilinear movement in predetermined distance between an initial position corresponding to no-load condition of the weighing apparatus and a terminal position corresponding to capacity weight loading of the apparatus, wherein the extent of member movement in said distance is proportional to weighing response of the apparatus, the combination therewith of support means extending in said housing region, a transducer having an element movable to vary the effect of the transducer, means mounting the transducer on said support means, and means providing a motion-reducing operative connection between said member and the transducer movable element adapted and arranged for effecting element movement proportional to movement of said member and to an extent which is a predetermined fraction of the extent of movement of said member over said distance.

6. In weighing apparatus including an indicator housing, a counterbalance mechanism unit disposed centrally in the housing and defining with a side wall of the housing an unobstructed region therebetween, said unit providing weight indicator means including an indicator actuating member having rectilinear movement in predetermined distance between an initial position corresponding to no-load condition of the weighing apparatus and a terminal position corresponding to capacity weight loading of the apparatus, wherein the extent of member movement in said distance is proportional to weighing response of the apparatus, the combination therewith of support means in said housing region providing an arm extending toward and having a terminal end near said housing wall, a transducer having an element movable to vary the effect of the transducer, means for mounting the transducer on said arm at any selected point thereof over the major portion of the arm length from its terminal end, and means providing a motion-reducing operative connection between said member and the transducer movable element in the mounted position of the transducer at any selected point along said arm length portion, said operative connection means being adapted and arranged for effecting element movement proportional to movement of said member and in movement extent which is a fraction of the extent of movement of the member over said distance, and for determining such movement extent of the element at a greater or lesser fraction of member movement according to the mounted position of the transducer along said arm portion.

References Cited by the Examiner

UNITED STATES PATENTS

| 2,885,198 | 5/1959 | Roessler | 177—210 |
| 3,084,551 | 4/1963 | Westman | 177—210 X |
| 3,153,459 | 10/1964 | Smith et al. | 177—210 X |

FOREIGN PATENTS 133,085  4/1933  Austria.

LEO SMILOW, *Primary Examiner.*